United States Patent [19]
Shibazaki et al.

[11] Patent Number: 5,377,113
[45] Date of Patent: Dec. 27, 1994

[54] NAVIGATION SYSTEM FOR USE IN VEHICLE

[75] Inventors: Masami Shibazaki; Tatsuhiko Abe, both of Saitama, Japan

[73] Assignee: Zexel Corporation, Tokyo, Japan

[21] Appl. No.: 56,912

[22] Filed: May 5, 1993

[30] Foreign Application Priority Data

May 27, 1992 [JP] Japan .................. 4-041917

[51] Int. Cl.$^5$ ............................. G06F 15/50
[52] U.S. Cl. .................... 364/449; 364/444; 340/990; 340/995
[58] Field of Search ............ 364/443, 444, 449; 73/178 R; 340/988, 990, 995

[56] References Cited

U.S. PATENT DOCUMENTS

| | | | |
|---|---|---|---|
| 4,763,270 | 8/1988 | Itoh et al. .................. | 364/449 |
| 4,926,336 | 5/1990 | Yamada ...................... | 364/449 |
| 4,937,753 | 6/1990 | Yamada ...................... | 364/449 |
| 4,943,925 | 7/1990 | Morota et al. ............... | 364/444 |
| 4,992,947 | 2/1991 | Nimura et al. ............... | 364/444 |
| 5,067,082 | 11/1991 | Nimura et al. ............... | 340/995 |
| 5,115,399 | 5/1992 | Nimura et al. ............... | 340/995 |
| 5,168,452 | 12/1992 | Yamada et al. ............... | 340/995 |
| 5,191,532 | 3/1993 | Moroto et al. ............... | 340/990 |

FOREIGN PATENT DOCUMENTS 62-51000 3/1987 Japan .
63-271110 11/1988 Japan .

*Primary Examiner*—Gary Chin
*Attorney, Agent, or Firm*—Fish & Richardson

[57] ABSTRACT

In a navigation system for use in a vehicle, an administrative district and a first and a second roads are inputted by an input device. In the inputted administrative districts, an intersection formed by the inputted first and second roads is determined. The determined intersection is provided as at least one of a starting point intersection and a destination intersection. An optimum route from the starting point intersection to the destination intersection is computed.

2 Claims, 4 Drawing Sheets

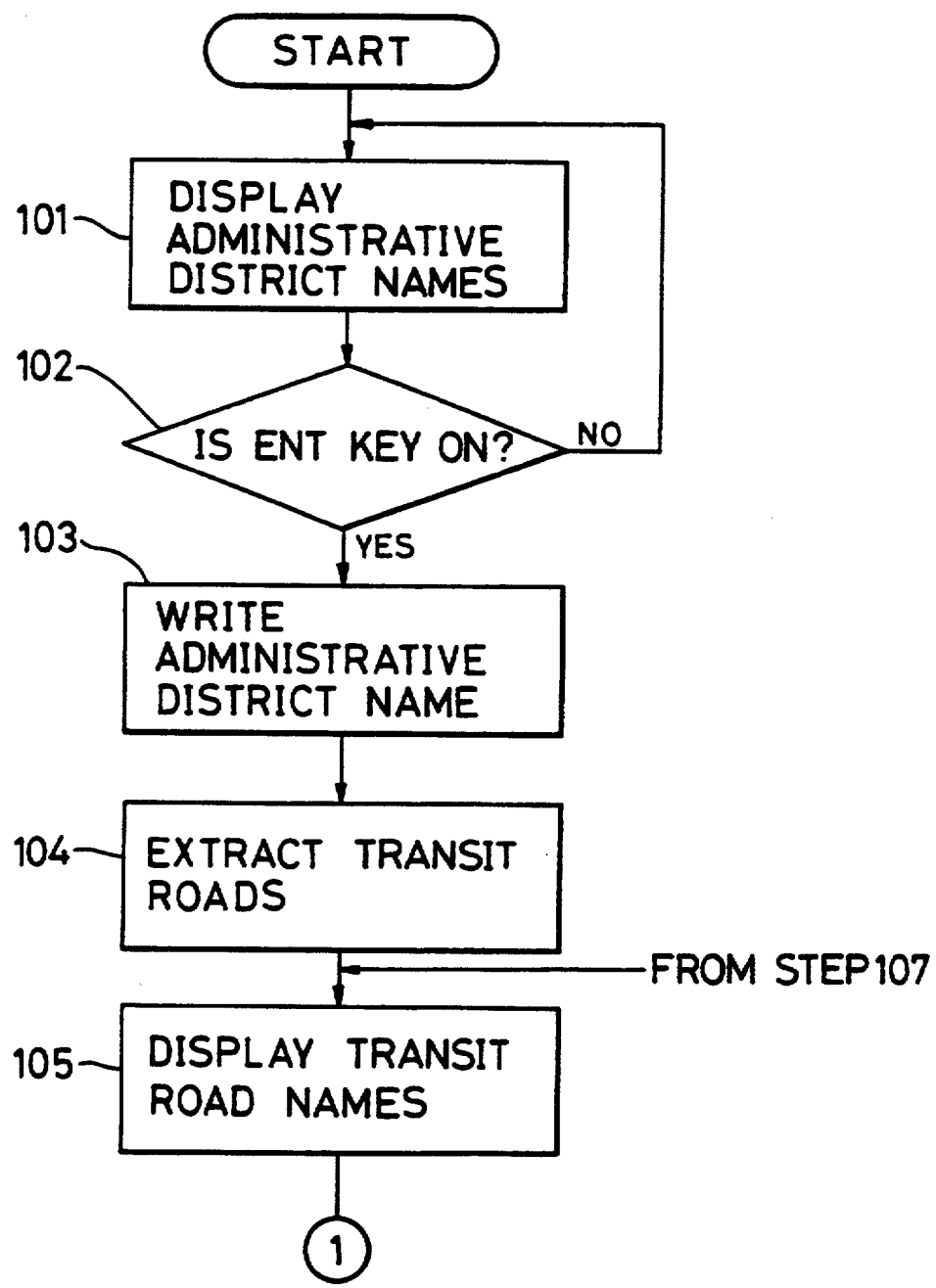

NAVIGATION SYSTEM FOR USE IN VEHICLE

BACKGROUND OF THE INVENTION

This invention relates to a navigation system which is operated to compute an optimum route from a starting point intersection to a destination Intersection and guide a vehicle along this optimum route.

In a navigation system disclosed in Japanese. Laid-Open Patent Application No. 173299/89 (U.S. Pat. No. 4,937,753), when a starting point and a destination are inputted, one of the intersections near the starting point is determined as a starting point intersection and one of the intersections near the destination is determined as a destination intersection. Then, an optimum route from the starting point to the destination via the starting point intersection and the destination intersection is computed. When running, the vehicle is guided along the optimum route. In this navigation system, it is necessary to input data as to where the starting point is and where the destination is in detail and correctly. However, the driver sometimes does not remember the starting point and destination In detail. In this case, since it is practically impossible to input the starting point and destination, the navigation system is not useful.

In the above-mentioned Laid-Open Application, there is disclosed, as the prior art, a navigation system in which the starting point intersection and the destination intersection are inputted directly. However, there is no specific description on how to input the starting point intersection and the destination intersection.

In a navigation system discussed in Japanese Laid-Open Patent Application No. 51000/87, many district names are indicated on many touch keys displayed on a screen of a display unit (FIG. 12) when the screen is in a destination input mode. The driver touches some of the touch keys with his fingers to select the name of a district where the destination exists. Upon selection, as shown in FIG. 13, a map of the selected district is displayed on the screen of the display unit but in many divided sections. The driver selects, through the touch keys, one of the divided sections where the destination exists. Upon selection, the map of the selected section is enlarged and displayed on the screen but in further narrowly divided sections as shown in FIG. 14. Among them, the driver selects one section (one of the narrowly divided sections) where the destination exists, through the touch keys. When the narrowly divided section (or district) where the destination exists is selected, the destination intersection existing in this narrowly divided section is determined. In the same procedure, a narrowly divided section (or district) where the starting point exists is selected and the starting point intersection is determined. Then, an optimum route between the starting point intersection and the destination intersection is computed. In this navigation system, unless the driver knows the map of the starting point and destination well, the optimum route cannot be computed. In this navigation system, it is possible to display a list of names of famous facilities (FIG. 15) by turning ON a touch key indicating "LIST" when the screen is in the mode of FIG. 14, and therefore one of the names of facilities can be inputted as the destination. However, if the destination is not a famous facility and therefore not included in the list, the optimum route cannot be computed.

In another navigation system disclosed by Japanese Laid-Open Patent Application No. 271110/88, a list of city names is displayed first on the screen of the display unit. When one of the city names is selected through a touch key. the names of small administrative districts such as towns, etc. which exist in the selected city are listed on the display screen. When one of the small administrative districts is selected through the touch key, even smaller administrative districts than the first-mentioned small administrative district are listed. In this way, tile destination can be determined by several touch key operations made by the driver on the screen of tile display unit. However, in this system, it is necessary for the driver to remember the names of small administrative districts.

SUMMARY OF THE INVENTION

It is therefore an object of the present invention to provide a navigation system for use in a vehicle which can compute an optimum route based on a road name comparatively clearly remembered by the driver even if the driver does not remember the starting point and/or the destination clearly and in detail.

According to the present invention, there is provided a navigation system comprising:

(a) map information storage means for storing intersections, a net of roads, and administrative districts;

(b) administrative district input means for inputting a name of an administrative district;

(c) first road input means for inputting a name of a first road;

(d) second road input means for inputting a name of second road;

(e) intersection determination means for determining an intersection formed by such inputted first and second roads in the inputted administrative district; and (f) optimum route computation means for computing an optimum route from a starting point intersection to a destination intersection, at least one of the starting point intersection and the destination intersection being the intersection determined by the intersection determination means.

BRIEF DESCRIPTION OF THE DRAWINGS

FIG. 2A is a flow chart showing a first-half of a program for determining a starting point intersection and/or a destination intersection;

DETAILED DESCRIPTION OF THE INVENTION

Figure 1:
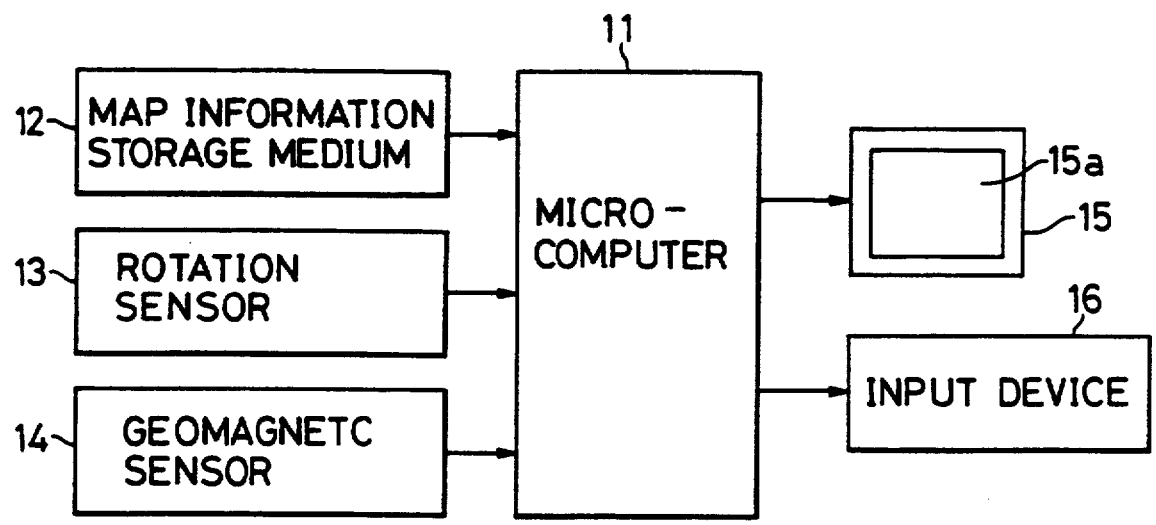
FIG. 1 is a block diagram showing a general construction of one embodiment of the present invention.

The present invention will be described hereinafter with reference to the accompanying drawings. FIG. 1 shows a general construction of a navigation system according to the present invention. This navigation system comprises a microcomputer 11, a map information storage medium 12, a rotation sensor 13, a geomagnetic sensor 14, a display unit 15, and an input device 16.

The map information storage medium 12 comprises an external memory such as a ROM (Read Only Memory) or the like, and stores map information of at least intersections, a net of roads, and administrative districts such as cities, towns and villages. The names of administrative districts and the names of roads are stored in alphabetical sequence, respectively. The names of administrative districts are classified into 26 groups under each alphabetical initial letter. The same is true to the names of roads. However, since the names of roads sometimes include a group having a numerical figure as an initial letter, such as "1 AVE", they are classified into 27 groups.

The rotation sensor 13 outputs a pulse in accordance with rotation of an output shaft of a transmission. The geomagnetic sensor 14 outputs a signal representative of a direction of a vehicle. The microcomputer 11 computes an integrated running distance in accordance with the pulse from the rotation sensor 13, then computes a change of a running direction of the vehicle in accordance with the signal from the geomagnetic sensor 14, and then computes a current site or position with reference to the results of these two computations.

The display unit 15 comprises a CRT display unit, or the like and makes a display of output information, as later described, from the microcomputer 11 on its screen 15a. In this embodiment, the input device 16 includes touch keys shown on the screen 15a of the display unit 15, and are capable of inputting information necessary for navigation into the microcomputer 11. A keyboard may be used as the input device 16.

The microcomputer 11 computes a starting point and a destination in accordance with the map information stored in the map information storage medium 12 and the information inputted by a driver, and computes an optimum route. For running of the vehicle, the microcomputer 11 extracts a map of a district including the current position of the vehicle from the map information storage medium 12 and prepares an image showing a mark indicative of the current position of the vehicle as well as the optimum route superimposed on the map. By outputting and displaying this image on the display unit 15, guidance is provided to the driver. This guidance may be shown by way of an indication arrow indicative of a direction where the vehicle should proceed.

Determination of the starting point and the destination will now be described in detail. In principle, by inputting two road names, tile starting point intersection and the destination intersection are determined as the starting point and the destination respectively. In this embodiment, addresses along the roads respectively can also be inputted as the starting point and the destination.

Figure 2B:
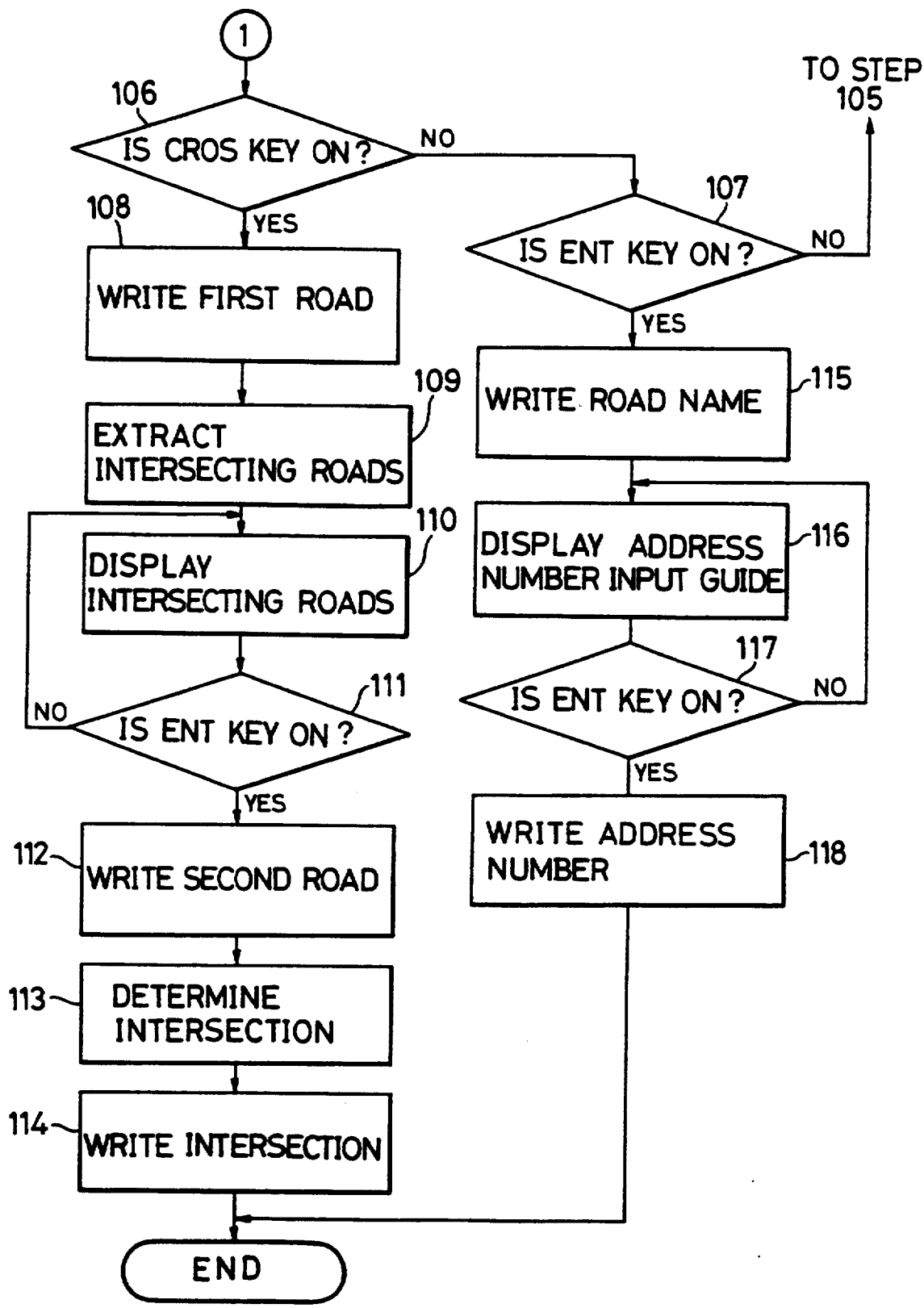
FIG. 2B is a flow chart showing a second-half of the above program.

When a starting point input mode or a destination input mode is selected by the touch key operation on the screen 15a of the display unit 15, the programs of FIGS. 2A and 2B are executed. Let's presume here that the destination input mode is selected.

Figure 3A:
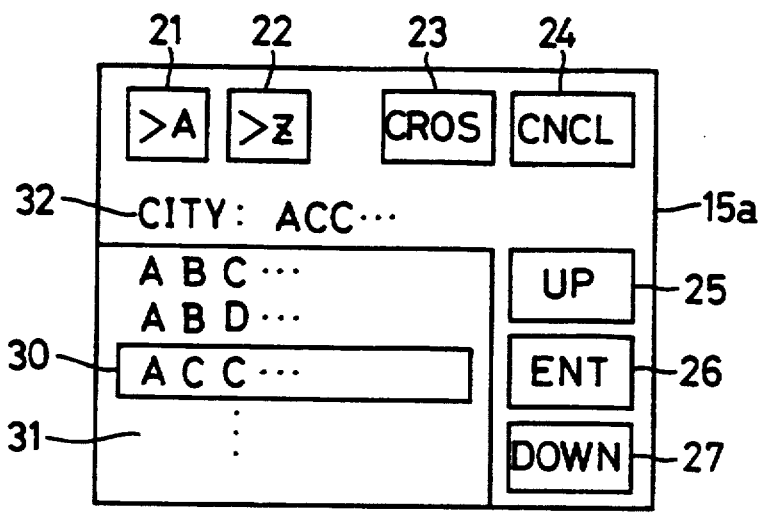
FIG. 3A is a schematic view of a screen of a display unit showing a list of the names of administrative districts.

First, the names of cities, towns and villages as administrative districts are read from the map information storage medium 12, and listed in a listing area 31 of the screen 15a of the display unit 15 as shown in FIG. 3A (Step 101). A cursor 30 is also displayed in the listing area 31. The name designated by this cursor 30 is also shown in a display area 32 above the listing area 31. In the screen 15a, there are arranged, as the touch keys, a normal scroll key 21, a reverse scroll key 22, a CROS key 23, a CNCL key 24, an UP key 23, and an ENT key 26, and a DOWN key 27.

The names of administrative districts having an initial "A" are read from the map information storage medium 12 and displayed in the listing area 31 first. Every time the normal scroll key 21 is turned ON once, the names shown in the listing area 31 are switched to those having the initial letter "B", and then to those having the initial letter "C" and so on in accordance with the alphabetical sequence of the names of administrative districts. On the other hand, when the reverse scroll key 22 is turned ON, the names shown in the listing area 31 are switched to those having the initial letter "Z". Thereafter, every time the reverse scroll key 22 is turned ON once, the names shown in the listing area 31 are switched to those having the initial letter "Y", and then those having the initial letter "X" and so on. For example, if the initial letter of the administrative district name where the destination exists is "C", district names having the initial of "C" can be displayed by turning ON the normal scroll key 21 twice.

After the desired group of administrative district names are listed in the listing area 31 by the scroll operation, the cursor 30 is brought to a desired administrative district name by properly operating the UP key 25 or the DOWN key 27. Thereafter, the ENT key 26 is turned ON to input the desired administrative district name.

When the CNCL key 24 is turned ON, the screen currently displayed can be brought back to the screen displayed before. For example, when the CNCL key 24 is turned ON during the display of the administrative district names, the screen is switched to a mode selection screen. When the CNCL key 24 is turned ON during the display of the names of transit roads as later described, the screen is switched to a mode for displaying the administrative district names, and when the CNCL key 24 is turned ON during the display of the names of intersecting roads as later described, the screen is switched to the mode for displaying the names of the transit roads. The above-mentioned scroll functions, cursor moving functions, and display mode changing functions are not shown in FIGS. 2A and 2B for the purpose of simplification.

Referring back to the flow charts of FIGS. 2A and 2B, the program proceeds to Step 102 after Step 101. In Step 102, it is judged whether or not the ENT key 26 is turned ON. When the ENT key 26 is not turned ON, the procedures of Step 101 and Step 102 are repeated. In contrast, when it is Judged in Step 102 that the ENT key 26 is turned ON, the program proceeds to Step 103 where the administrative district name indicated by the cursor 30 is written in the memory. As apparent from the foregoing description, the ENT key 26 is served as the administrative district input means.

Figure 3B:
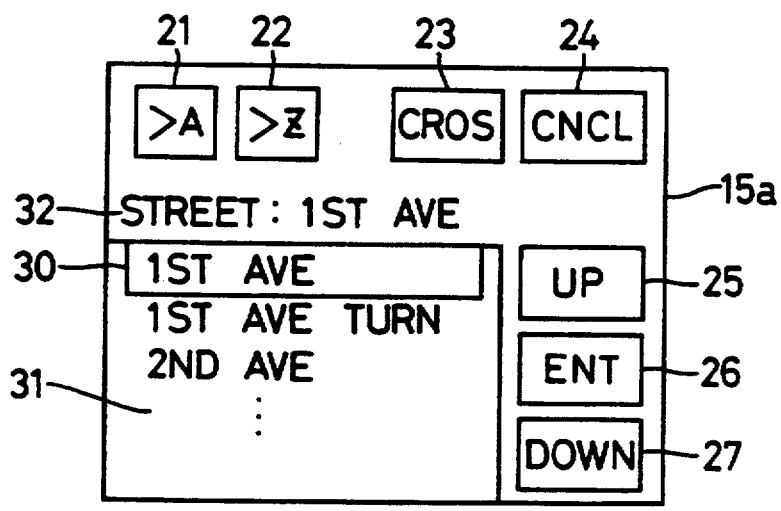
FIG. 3B is likewise a schematic view of the screen of the display unit but showing a list of the names of transit roads passing through an administrative district selected.

In Step 104, the roads (transit roads) passing through the selected administrative district are extracted from the map information storage medium 12. As shown in FIG. 3B, the names of the transit roads thus extracted are listed in the listing area 31 of the screen 15a of the display unit 15 (Step 105). Since during the display of the road names, the scroll and cursor movements are the same as in the case of the administrative district display, description thereof is omitted. It is noted here that the names of roads having a numerical figure as their initial letters are listed.

Then, it is judged whether or not the CROS key 23 is turned ON (Step 106). If the judgment result is negative, it is judged whether or not the ENT key 26 is turned ON in Step 107. If the Judgment result in Step 107 is also negative, the procedure of Step 105 is repeated again.

After the cursor 30 is brought to a desired road name by operating the UP and DOWN switches 25 and 27 as well as the scroll switches 21 and 22, the driver turns ON either the CROS scroll key 23 or the ENT key 26. Specifically, if the exact address number of the destination is not known, the CROS scroll key 23 is turned ON, but if known, the ENT key 26 is turned ON.

When the CROS key 23 is turned ON, the judgment in the Step 106 is made in the affirmative and the program proceeds to Step 108. In Step 108, the road name where the cursor 30 is brought to when the CROS key 23 is turned ON, is written in the memory as a first road. As apparent from the foregoing description, the CROS key 23 is functions as first road input means.

Figure 3C:
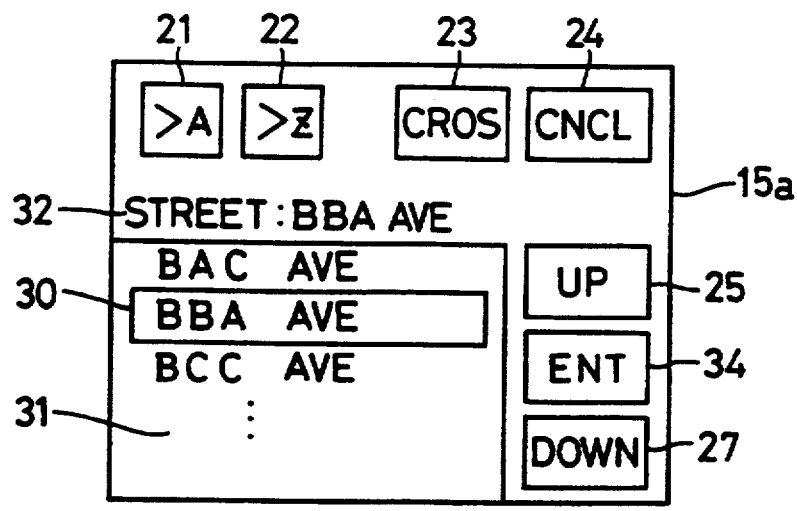
FIG. 3C is likewise a schematic view of the screen of the display unit but showing a list of the names of roads intersecting the selected transit road.

Then, the program proceeds to Step 109. In Step 109, the roads passing through the selected administrative district and intersecting the first road are extracted from the map information storage medium 12. When the extraction is finished, the program proceeds to Step 110 where the names of the intersecting roads are listed in the listing area 31 of the screen 15a as shown in FIG. 3C. In the same procedure as mentioned above, the driver brings the cursor 30 to a desired intersecting road and turns ON the ENT key 26.

After the Step 110, the program proceeds to Step 111 where it is judged whether or not the ENT key 26 is turned ON. If the ENT key 26 is not turned ON, the Step 110 is repeated.

When the driver turns ON the ENT key 26, the judgment is made in the affirmative in Step 111 and then the program proceeds to Step 112. In Step 112, the selected intersecting road is written in the memory as a second road. As apparent from the foregoing description, the ENT key 26 is functioned also as second road input means.

Then, an intersection formed by the first and second roads is determined (Step 113). The determined intersection is written in the memory as a destination intersection (Step 114).

If the judgment result in Step 106 is "NO" but the judgment result is "YES" in Step 107 (that is, during the procedure for repeating the Step 105, the CROS key 23 is not turned ON but the ENT key 26 is turned ON), the program proceeds to Step 115. In Step 115, the name of a transit road where the cursor 30 is brought to when the ENT key 26 is turned ON, is written in the memory. In the next Step 116, an address number input guide is displayed on the screen of the display unit 15. After inputting the address number by properly operating ten keys (not shown) serving as the touch keys displayed on the screen 15a, the driver turns ON the ENT key 26. Then, the Judgment is made in the affirmative in the next Step 117, and the program proceeds to Step 118 where the address number is written in the memory.

When a starting point input mode is selected, either the starting point intersection or the address number of the starting point is written in accordance with the same program as mentioned above.

Figure 4:
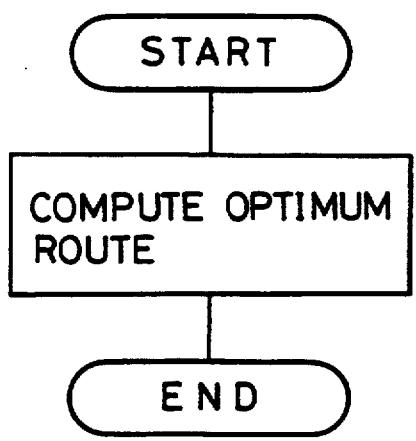
FIG. 4 is a flow chart showing a program for computing an optimum road.

As mentioned above, when an optimum route computation mode is selected by operating the touch keys after the starting point and the destination are determined, the microcomputer 11 executes the optimum route computation of FIG. 4. In this case, if both the starting point and the destination are determined as intersections, an optimum route from the starting point intersection to the destination intersection is computed. If, for example, the starting point and the destination are correctly determined by address numbers, an optimum route from the starting point to the destination is computed. In that case, the optimum route includes an optimum route from a starting point intersection nearest to the starting point to a destination intersection nearest to the destination.

As mentioned above, even if the driver does not know the exact address of the destination (or starting point), he usually remembers road names comparatively well. Therefore, by inputting the names of two roads forming the destination intersection, he can have the microcomputer 11 compute the optimum route. Even if the driver's memory of the road names are not clear, he may remember the road names by seeing the listed road names. Therefore, it becomes possible for him to input the road names easily.

For determination of the starting point intersection or the destination intersection, it is necessary to input two road names. Since the driver usually remembers the first road name correctly, the first road name may be inputted by typing alphabetical letters. In this case, only the roads intersecting the first road may be listed on the screen. Depending on use of the navigation system, there is a possibility that the driver remembers two road names clearly. In that case, the two road names may be inputted by typing alphabetical letters and without listing the road names on the screen.

In the above embodiment, city, town and village are listed as one group, but they may be separately listed.

Instead of the starting point determined in accordance with the present invention, a current position computed in accordance with a signal from a plurality of artificial satellites may be served as the starting point.

The present invention is not limited to the above embodiment, but various changes and modifications can be made without departing from the spirit and scope of the invention.

What is claimed is:

1. A navigation system comprising:
   (a) a display unit;
   (b) map information storage means for storing map information, said map information including intersections, a net of roads, and administrative districts;
   (c) destination input mode executing means for executing a destination input mode to determine a destination intersection;
   (d) optimum route computation means for computing an optimum route from a starting point intersection to said destination intersection;
   (e) current position detection means for detecting a current position of a vehicle; and
   (f) route guidance display means for displaying route guiding information on said display unit based on the optimum route and the current position;
   wherein said destination input mode executing means includes:
   (i) first list means for listing names of the administrative districts on said display unit;
   (ii) administrative district input means for inputting one of the listed administrative districts;
   (iii) second list means for listing names of transit roads passing through the inputted administrative district on said display unit;

(iv) first road input means for inputting one of the listed transit roads as a first road;

(v) third list means for listing names of intersecting roads on said display unit, the intersecting roads intersecting said first road and passing through the inputted administrative district;

(vi) second road input means for inputting one of the listed intersecting roads as a second road; and (vii) intersection determination means for determining said destination intersection formed by said inputted first and second roads.

2. A navigation system according to claim 1, further comprising cursor display means for displaying a cursor on said display unit when the names of one of the administrative districts, the transit roads and the intersecting roads are listed on said display unit, said administrative district input means inputting said one of the administrative districts designated by said cursor, said first road input means inputting said one of the transit roads designed by said cursor, and second road input means inputting said one of the intersecting roads designated by said cursor.

* * * * *